(12) United States Patent
Funazaki et al.

(10) Patent No.: US 6,407,860 B1
(45) Date of Patent: Jun. 18, 2002

(54) FRESNEL LENS SHEET

(75) Inventors: Kazuo Funazaki; Hideki Kobayashi, both of Nakajho-machi (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/451,775

(22) Filed: Dec. 1, 1999

(30) Foreign Application Priority Data

Dec. 2, 1998 (JP) .............................. 10-342490

(51) Int. Cl.[7] ........................ G03B 21/60; G03B 21/56; G02B 3/08
(52) U.S. Cl. ........................ 359/457; 359/460; 359/743
(58) Field of Search ................. 359/457, 742, 359/460, 743

(56) References Cited

U.S. PATENT DOCUMENTS

| | | | | |
|---|---|---|---|---|
| 4,787,722 A | * | 11/1988 | Claytor | ........................ 359/742 |
| 5,803,567 A | * | 9/1998 | Nakanishi | ..................... 353/74 |
| 5,847,889 A | * | 12/1998 | Komiyama et al. | ......... 359/851 |
| 6,243,215 B1 | * | 6/2001 | Hirota et al. | ................ 359/742 |
| 6,249,376 B1 | * | 6/2001 | Goto | ........................... 359/457 |
| 6,268,960 B1 | * | 7/2001 | Hirota et al. | ................ 359/460 |
| 6,282,034 B1 | * | 8/2001 | Onishi et al. | ................ 359/742 |

\* cited by examiner

*Primary Examiner*—Christopher Mahoney
*Assistant Examiner*—Pnagda Cruz
(74) *Attorney, Agent, or Firm*—Oblon, Spivak, McClelland, Maier & Neustadt, P.C.

(57) ABSTRACT

Provided is a Fresnel lens sheet having the advantage of reducing unnecessary rays of light that may go out around the center area of the concentrically-configured Fresnel lens of the sheet. When it is combined with a lenticular lens sheet to construct a viewing screen, the screen has the advantage of preventing white spots from appearing around its center area. The Fresnel lens sheet is for screens for rear projection image displays, and is characterized in that the lens pitch in the center area of the concentrically-configured Fresnel lens of the sheet differs from that in the peripheral area thereof, and that the lens pitch in the center area is larger than that in the peripheral area.

7 Claims, 7 Drawing Sheets

θ : RISER ANGLE
η : FRESNEL ANGLE

FRESNEL LENS SHEET

BACKGROUND OF THE INVENTION

1. Field of the Invention

The present invention relates to a Fresnel lens sheet for use in rear projection image displays.

2. Description of the Related Art

Rear projection image displays (often referred to as "rear projection television (PTV) systems") are to display optical images from cathode ray tubes (CRTs), liquid-crystal panels or the like on a large screen by magnifying and projecting the optical images onto the screen via projection lenses disposed in the rear of the screen. One example of such PTV systems is schematically illustrated in FIG. 10 showing its constitution. In the PTV system illustrated, three CRTs 1 for red (R), green (G) and blue (B) image portions project optical images, and projection lenses 2 magnify and converge the thus-projected optical images on a screen 3. The screen 3 generally comprises a Fresnel lens sheet 4 having the function of collecting the projected rays in the direction of a viewer, and a lenticular lens sheet 6 having the function of dispersing the rays from the Fresnel lens sheet 4 in the horizontal direction of the screen and in the vertical direction thereof.

The configuration of the Fresnel lens sheet 4 to be in the screen for rear projection image displays is schematically shown in FIG. 11B. As illustrated, the configuration of the Fresnel lens sheet 4 is such that the plural facets to be obtained by concentrically dividing the lens surface of a convex lens (as in FIG. 11A) are rearranged on a single plane, and the sheet 4 acts as a convex lens. The lens surface of the Fresnel lens sheet 4 has a plurality of Fresnel facets 4x all acting as the lens surface of a convex lens, and has a plurality of rising surfaces 4y each being between the neighboring Fresnel facets. An enlarged cross-sectional view schematically showing a part of a Fresnel lens sheet is shown in FIG. 12. As illustrated, the angle between the line (shown as a single dotted line in FIG. 12) parallel to the lens sheet surface 5 of the Fresnel lens sheet 4 and the Fresnel facet surface 4x is referred to as a Fresnel angle, η and the angle between the normal line drawn perpendicular to the Fresnel lens sheet 4 and the rising surface 4y is referred to as a riser angle, θ.

On the other hand, a perspective view of the lenticular lens sheet 6 is shown in FIG. 13. As illustrated, the lenticular lens sheet 6 has a large number of lenticular lenses 7 all extending in the vertical direction, and these lenses 7 diffuse the rays of light having entered the sheet 6, in the horizontal direction. On its viewer's side, the sheet 6 has black stripes 8 all extending in the vertical direction, and these black stripes 8 absorb the reflective light on the surface of the viewer's side of the sheet 6, thereby improving the image contrast through the sheet 6. In the sheet 6, the lenticular lenses 7 and the black stripes 8 are all arranged at a constant pitch.

In general, Fresnel lens sheets are produced in a 2P (photo-polymerization) process or a pressing process in which is used a mold as prepared by lathing a metal plate or the like to form grooves on its surface at a predetermined pitch. For preparing the mold by lathing, generally used is a lathing tool having an edge angle of from about 30 to 90 degrees. FIG. 14 is a view schematically showing the mode of cutting a mold with a lathing tool. As illustrated, the edge tip 9a of the lathing tool 9 cuts the surface of a mold 10 to give a cut surface (indicated by "y" in FIG. 14), and the cut surface "y" of the mold 10 is to give the rising surface of the Fresnel lens to be produced with the mold. On the other hand, the cutting edge 9b of the lathing tool 9 also cuts the surface of the mold 10 to give another cut surface (indicated by "x" in FIG. 14), and the cut surface "x" of the mold 10 is to give the Fresnel facet surface of the Fresnel lens.

While the mold is cut with a lathing tool, the tool is abraded and the mold cut with the abraded tool is deformed. As a result, the profile of the cut surface of the mold cut with a fresh lathing tool often differs from that of the mold cut with the same but much used and abraded lathing tool. On the other hand, when Fresnel lens sheets are produced in a 2P process or a pressing process, correctly transferring the profile of the mold onto the Fresnel lens sheets produced will be often impossible. In any case, the profile of the Fresnel lens surface of the Fresnel lens sheets produced will delicately differ from the original as designed to be an optically optimal one. The Fresnel lens sheet of which the profile of the Fresnel lens surface differs from the designed one may often give some unexpected and unnecessary rays of light. If the Fresnel lens sheet produces such unnecessary rays of light around its center, viewers will see them as uneven bright spots that are unpleasant to the viewers. (The uneven bright spots are hereinafter referred to as "white spots".) For example, when a complete white signal is inputted into a rear PTV system having a deformed Fresnel lens sheet and when a person views the screen of the system at a distance of 1.5 m spaced from the front of the screen, the viewer may often see some oval white spots having a diameter of from 5 mm to 15 mm in the area spaced above in some degree from the center of the concentric circles of the Fresnel lens sheet.

As a rule, in a viewing screen that comprises a combination of a Fresnel lens sheet and a lenticular lens sheet, the ratio of the constant pitch of the concentrically-configured Fresnel lens of the Fresnel lens sheet (the pitch is hereinafter referred to as "PF") to the constant pitch of the lenticular lenses constituting the lenticular lens sheet (the pitch is hereinafter referred to as "PL") is so defined as to reduce moire fringes appearing on the screen. For example, Japanese Patent Laid-Open No. 95525/1984 discloses a technique of defining the ratio of PF/PL to fall within a range of from (N+0.35) and (N+0.43) or within a range of from 1/(N+0.35) and 1/(N+0.43), in which N indicates a natural number of from 2 to 12, thereby reducing moire fringes appearing on a viewing screen of that type.

The recent tendency in the art is toward reducing the pitch of the lenticular lenses constituting a lenticular lens sheet for use in viewing screens, for the purpose of realizing high-quality images, for example, in high-definition TV systems. In order to evade moire fringes appearing in viewing screens in those systems in that condition, the concentric pitch of the Fresnel lens of the Fresnel lens sheet to be combined with the lenticular lens sheet is being much reduced. Reducing the concentric pitch of the Fresnel lens of the Fresnel lens sheet results in the increase in the number of the concentric grooves of the Fresnel lens per the unit length of the sheet, thereby increasing the number of deformed Fresnel facets to give unnecessary rays of light causing white spots. Accordingly, with the increase in the number of Fresnel facets to be formed at a constant pitch on the lens surface of a Fresnel lens sheet, the problem with white spots in viewing screens is being much highlighted.

SUMMARY OF THE INVENTION

Given that situation, we, the present inventors have completed the present invention with its object to provide a Fresnel lens sheet capable of reducing unnecessary rays of light to go out of it around the center of the concentrically-configured Fresnel lens of the sheet thereby preventing white spots from appearing around the center of a viewing screen having the Fresnel lens sheet.

The Fresnel lens sheet of the invention to solve the problem noted above is for screens for rear projection image displays, and is characterized in that the lens pitch of the concentrically-configured Fresnel lens of the sheet in the center area of the lens differs from that in the peripheral area thereof, and that the lens pitch in the center area is larger than that in the peripheral area. In general, the center area of the concentrically-configured Fresnel lens of the sheet is in the area spaced from the concentric center of the lens by less than 20 mm, and the peripheral area is the other area of the lens except the thus-defined center area thereof. The Fresnel lens sheet of the invention is especially effective when the lens pitch in the center area (in the area spaced from the concentric center of the lens by less than 20 mm) is at least 0.1 mm. For example, in the Fresnel lens sheet of the invention, the lens pitch of the concentrically-configured Fresnel lens may be continuously or stepwise reduced in the direction from the center of the lens toward the periphery thereof, depending on the distance from the center, whereby the lens pitch in the center area of the lens may be made larger than that in the peripheral area thereof. In this embodiment, the lens pitch of the Fresnel lens may be continuously or stepwise reduced only partially in the defined direction while, in the other area, the lens pitch may be kept constant irrespective of the distance from the center of the lens. When the Fresnel lens sheet of the invention is combined with a lenticular lens sheet for use in rear projection image displays, it is desirable that, in the Fresnel lens sheet of the invention, the lens pitch of the Fresnel lens in the center area thereof is smaller than that of the lenticular lenses constituting the lenticular lens sheet.

DESCRIPTION OF THE PREFERRED EMBODIMENTS

As so mentioned hereinabove, the profile of the Fresnel lens surface of a Fresnel lens sheet could not often be a designed one for the reasons that the lathing tool for the mold for the sheet is abraded while being used for cutting the mold, that the mold is often deformed, and that the profile of the mold could not be transferred correctly onto the sheet formed with the mold in a 2P process or the like. As a result, some Fresnel lens sheets often give unexpected unnecessary rays of light. The reason why Fresnel lens sheets often give unnecessary bright rays of light in the center area thereof will be as follows.

Figure 1:
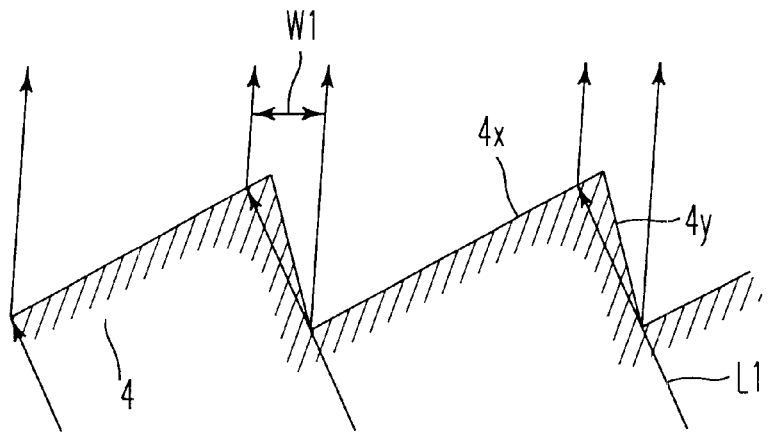
FIG. 1 is a view schematically showing the paths of the rays of light in the peripheral area of a Fresnel lens.
Figure 2:
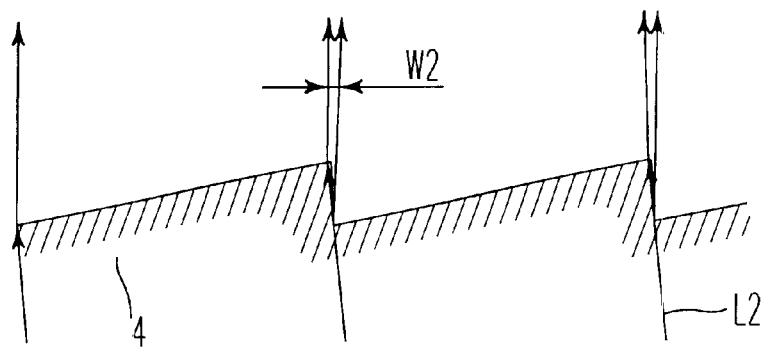
FIG. 2 is a view schematically showing the paths of the rays of light in the center area of a Fresnel lens.
Figure 5:
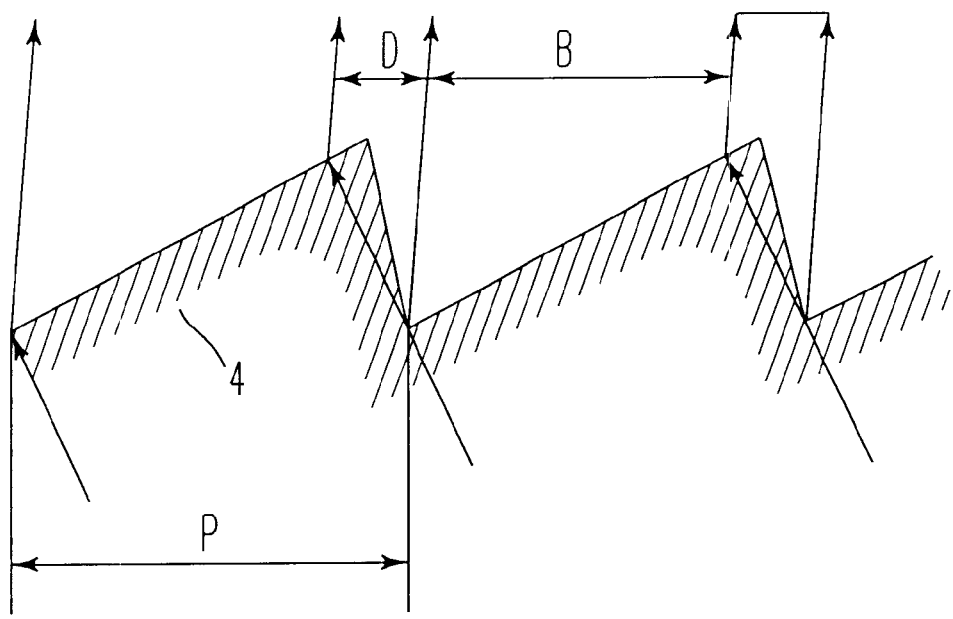
FIG. 5 is a schematic view for explaining moire fringes appearing on the screen.
Figure 10:
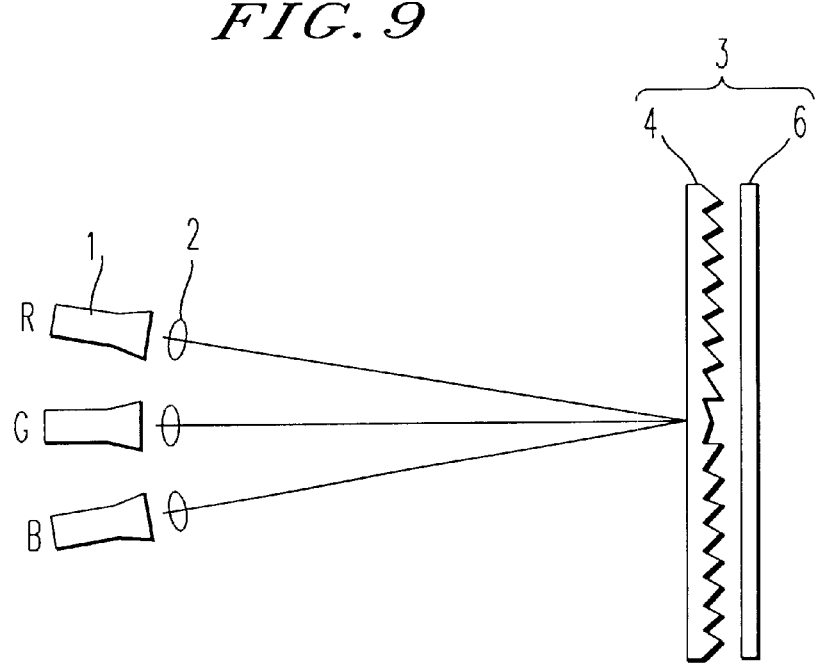
FIG. 10 is a view schematically showing the outline of a rear PTV system having a rear projection screen.
Figure 11:
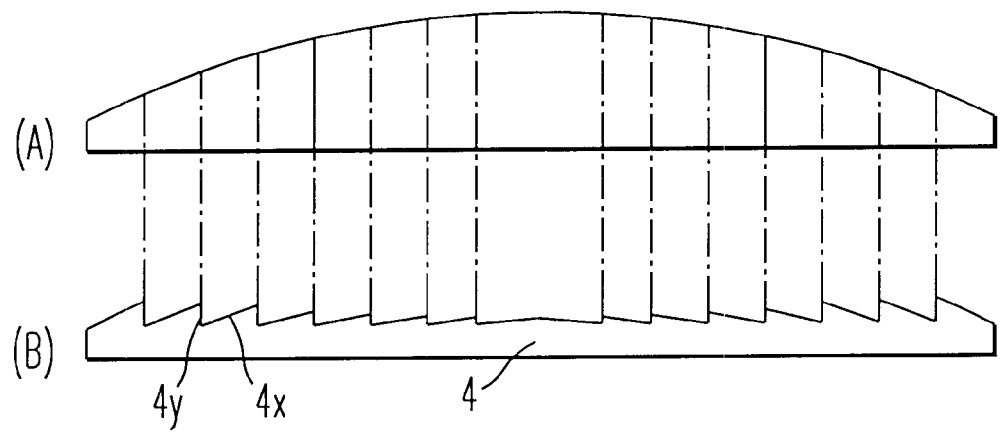
FIG. 11A and FIG. 11B are views for schematically indicating the cross section of one model of a Fresnel lens sheet.
Figure 12:
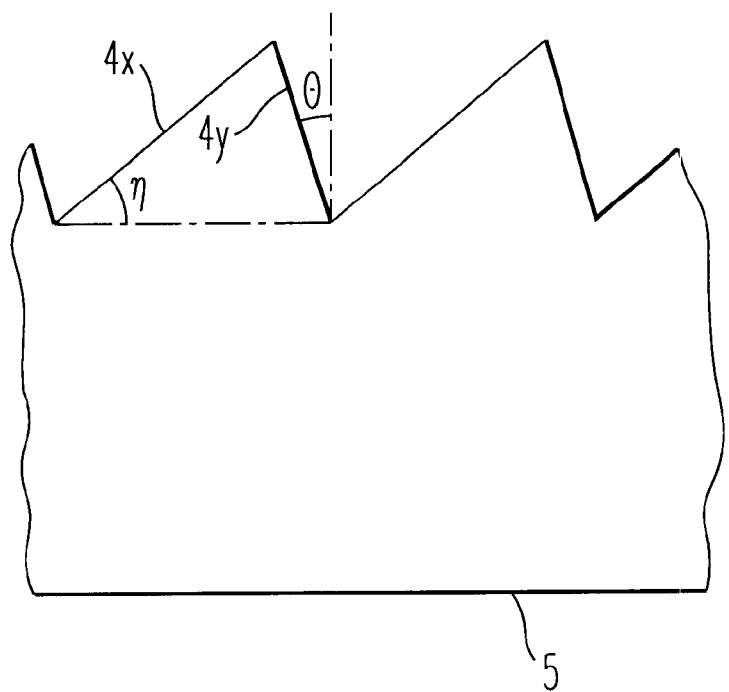
FIG. 12 is an enlarged cross-sectional view schematically showing a part of a Fresnel lens sheet.

As in FIG. 11B described hereinabove, the configuration of the Fresnel lens sheet 4 for viewing screens is such that the plural facets to be obtained by concentrically dividing the lens surface of a convex lens (as in FIG. 11A) are rearranged on a single plane. The paths of the rays of light having entered the peripheral area of a Fresnel lens sheet from CRTs or the like are shown in FIG. 1, and those of the rays of light having entered the center area thereof are in FIG. 2. As will be readily understood from FIG. 10 showing the constitution of a rear PTV system, the incident angle of the ray of light entering the peripheral area of the Fresnel lens (the ray is given by L1 in FIG. 1) is larger than that of the ray of light entering the center area thereof (the ray is given by L2 in FIG. 2). The ray L1 or L2 having been blocked by the rising surface 4y of the Fresnel lens could not reach the Fresnel facet surface 4x. Therefore, no ray of light passes through the region given by W1 in FIG. 1 and through the region given by W2 in FIG. 2. Comparing the length of W1 in FIG. 1 with that of W2 in FIG. 2, it is obvious that the region through which no ray of light passes is narrower in the center area of the Fresnel lens than in the peripheral area thereof. In FIG. 5, the width of the region through which no ray of light passes is given by D, and the width of the region through which rays of light pass is given by B. As illustrated, the ratio of the width D through which no ray of light passes to the lens pitch P is nearly 0% in the center area of the Fresnel lens. However, the ratio is about 50% in the peripheral area of an ordinary Fresnel lens sheet.

Figure 3:
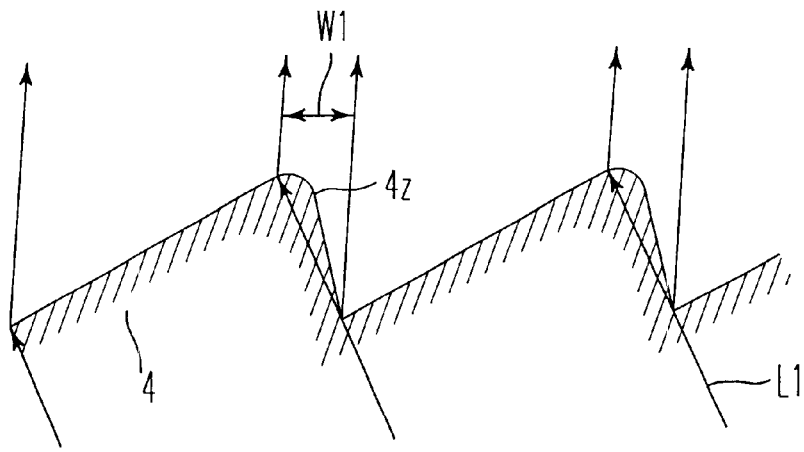
FIG. 3 is a view schematically showing the paths of the rays of light in the peripheral area of a deformed Fresnel lens.
Figure 4:
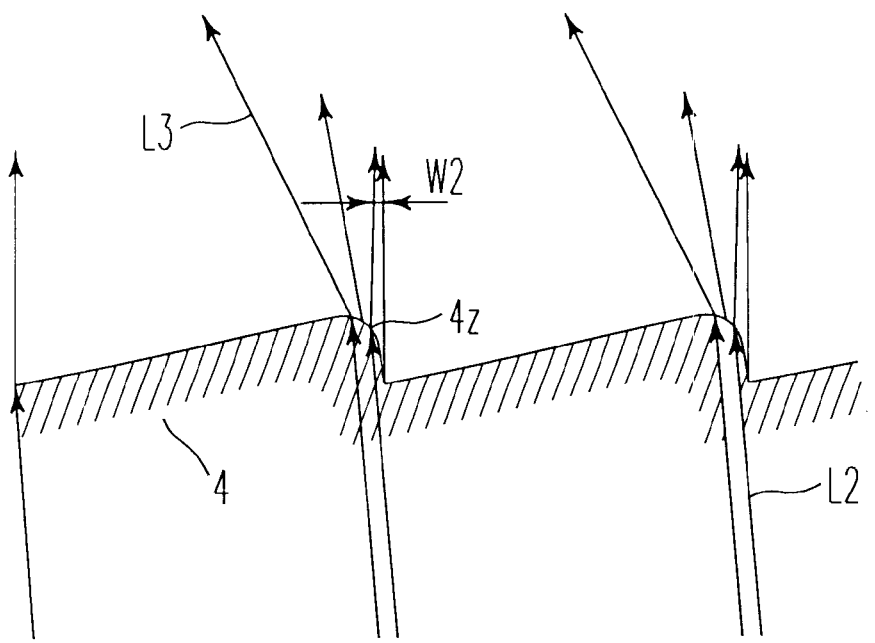
FIG. 4 is a view schematically showing the paths of the rays of light in the center area of a deformed Fresnel lens.

The profile of the Fresnel lens surface of a Fresnel lens sheet could not often be a designed one for the reasons that the lathing tool for the mold for the sheet is abraded while being used for cutting the mold, that the mold is often deformed, and that the profile of the mold could not be transferred correctly onto the sheet formed with the mold in a 2P process or the like. The degree by which the profile of the Fresnel lens surface of the actually produced Fresnel lens sheet is shifted and differs from that of the mold used does not vary so much even in different areas of the lens surface, or that is, the degree does not vary so much in the center area of the Fresnel lens and in the peripheral area thereof. FIG. 3 and FIG. 4 are referred to, showing the peripheral area and the center area, respectively, of a deformed Fresnel lens. In these, the profile of the Fresnel lens is shifted from the designed one by the same degree given by 4z, both in the center area and the peripheral area of the lens. 4z may indicate the deformed part in the lens. As so mentioned hereinabove, the width of the region through which no ray of light passes is narrower in the center area of the Fresnel lens than in the peripheral area thereof. Therefore, as in FIG. 3 showing the peripheral area of the deformed Fresnel lens, the deformed part 4z is within the range of the region W1 through which no ray of light passes, in the peripheral area of the lens. In that condition, the deformed part 4z has no negative influence on the optical properties of the Fresnel lens sheet. On the other hand, however, in the center area of the deformed Fresnel lens in which the region through which no ray of light passes is narrow (as indicated by FIG. 4), the deformed part 4z exceeds the narrow region W2 through which no ray of light passes. In that condition, therefore, a part of the ray L2 will pass through the deformed part 4z to give unexpected and unnecessary rays of light given by L3. As illustrated, the width of the region through which no ray of light passes naturally differs in the center area and the peripheral area of the Fresnel lens. Based on this, the center area of the Fresnel lens gives unexpected and unnecessary rays of light more readily than the center area thereof.

The Fresnel lens sheet of the invention is more effective when its lens pitch is finer. The reason is mentioned below.

It is believed that the unnecessary rays of light to be given by a Fresnel lens sheet will increase in proportion to the density of minor deformations in the sheet (that is, in proportion to the area of the deformed parts per the unit area of the sheet). It is also believed that the density of minor deformations in the Fresnel lens sheet will be in proportion to the number of the concentric grooves of the Fresnel lens per the unit length of the sheet. Accordingly, with the lens pitch of the Fresnel lens being finer, the unnecessary rays of light to be given by the Fresnel lens sheet shall increase. As a rule, the screen for rear PTV systems generally comprises a combination of a Fresnel lens sheet and a lenticular lens sheet. Therefore, through the screen of that type, the unnecessary rays of light L3 given by the Fresnel lens sheet do not directly reach viewers, but are diffused in the horizontal direction and in the vertical direction by the lenticular lens sheet. Since the unnecessary rays of light are so diffused by the lenticular lens sheet, viewers do not often see white spots.

Table 1 below shows viewing experimental data of some rear PTV systems for which five different Fresnel lens sheets each having a different but constant lens pitch were separately combined with one and the same lenticular lens sheet. The screens of those different five types were tested for the presence or absence of white pots appearing thereon. The test data indicate that the fineness of the lens pitch of the Fresnel lens sheet is correlated with the white pots appearing on the screens. Precisely, it is understood from the test data that the screens in which the Fresnel lens pitch is finer, or that is, shorter than 0.1 mm, give clear white spots.

TABLE 1

| Lens Pitch of Fresnel Lens (mm) | White Spots |
| --- | --- |
| 0.14 | ○ |
| 0.12 | Δ |
| 0.10 | Δ |
| 0.08 | × |
| 0.07 | × |

○: No white spot appeared.
Δ: Some but minor white spots appeared.
×: Clear white spots appeared.

With the recent tendency in the art toward high-quality and clear imaging with high resolution, for example, in high-definition TV systems, the lens pitch of lenticular lens sheets is being fined more. With this, the lens pitch of Fresnel lens sheets needs to be fined more. Conventional Fresnel lens sheets have a constant lens pitch falling between 0.1 and 0.15 mm or so. On the other hand, the lens pitch of recent Fresnel lens sheets having been developed for realizing fine and clear images of high quality is around less than 0.1 mm. The Fresnel lens sheets having such a fine lens pitch will give white spots, as in Table 1.

To the Fresnel lens sheet of that type having such a fine lens pitch, therefore, preferably applied is the present invention of reducing the lens pitch in the peripheral area of the lens. The invention is especially effective for the case of a Fresnel lens sheet where the center area spaced from the center of the concentrically-configured Fresnel lens by less than 20 mm has a lens pitch of at least 0.1 mm and the peripheral area spaced from the center of the lens by at least 30 mm has a lens pitch of at most 0.15 mm.

On the Fresnel lens sheet of the invention, formed is a lens having a varying lens pitch. Therefore, the sheet shall have a region where the lens pitch varies. However, if the lens pitch is varied too much in that region, different Fresnel lens configurations shall be adjacent to each other to give unpleasant shadows. Therefore, in the Fresnel lens sheet of the invention, it is desirable that the lens pitch of the concentrically-configured Fresnel lens is continuously reduced in accordance with the distance from the center of the lens. As the case may be, the sheet may have a region where the lens pitch of the concentrically-configured Fresnel lens is stepwise reduced in accordance with the distance from the center of the lens. In the latter case, it is desirable that the stepwise reduction in the lens pitch is attained in many parts in that region so that the degree of the reduction in each part could be as small as possible.

Figure 6:
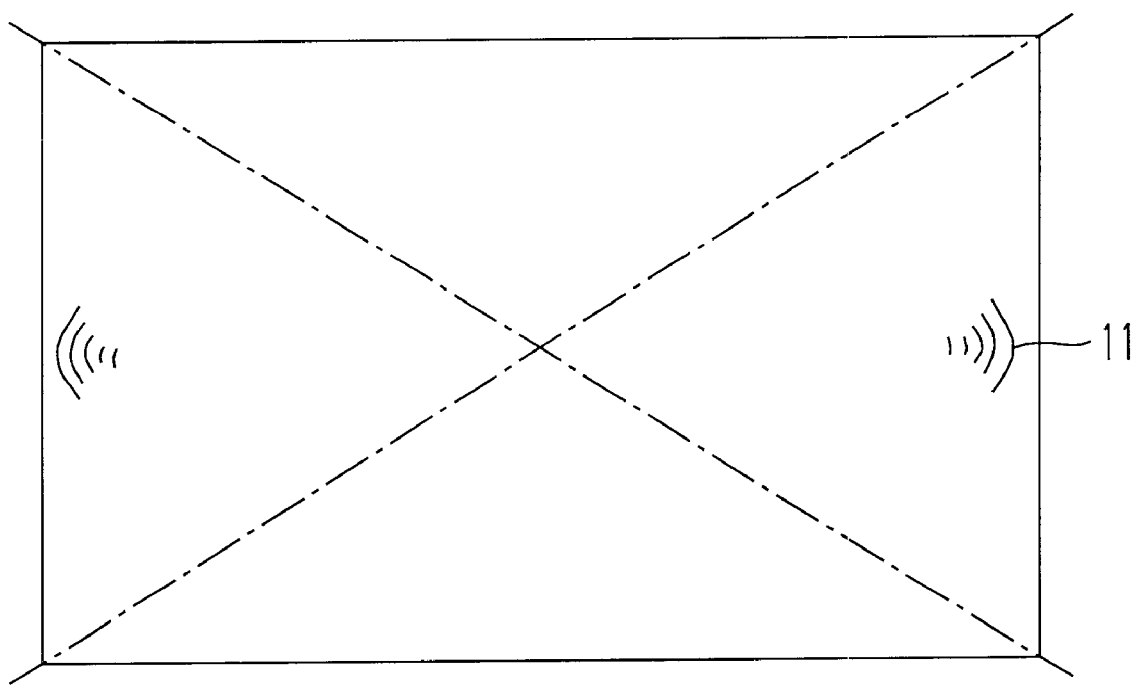
FIG. 6 is a view schematically showing the position of moire fringes appearing in a rear PTV screen.
Figure 13:
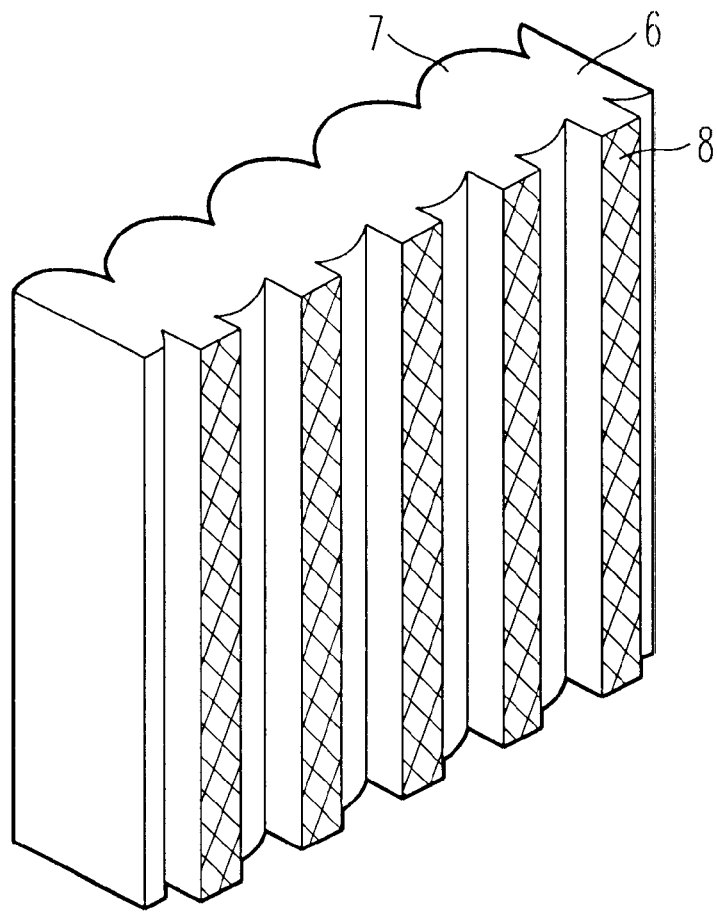
FIG. 13 is a perspective view schematically showing a lenticular lens sheet.
Figure 14:
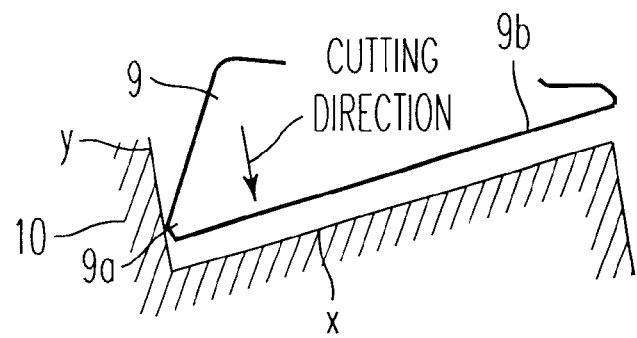
FIG. 14 is a view for schematically indicating a part of a mold for Fresnel lens sheets, in which the mold is being cut with a lathing tool.

FIG. 6 is referred to, which indicates the position of moire fringes appearing in a rear PTV screen. As illustrated, moire fringes (given by 11 in FIG. 6) appear only in the horizontal direction in the peripheral area of the screen, but not in and around the center area of the screen. Those moire fringes are from shade fringes given by the Fresnel lens sheet and the lenticular lens sheet constituting the screen. Specifically, as in FIG. 13, the lenticular lens sheet is provided with black stripes 8 periodically extending in the vertical direction. The black stripes 8 give periodic shade fringes in the horizontal direction of the lenticular lens sheet. On the other hand, rays of light could not pass through some region in the Fresnel lens sheet, thereby giving shade fringes on the sheet. The concentric shade fringes given by the Fresnel lens sheet and the periodic shade fringes given by the lenticular lens sheet in the horizontal direction produce moire fringes in the horizontal direction on the screen. In that condition, since the region through which rays of light could not pass is smaller in the center area of the Fresnel lens sheet that in the peripheral area thereof, few moire fringes are seen in the center area of the sheet. Accordingly, there is no necessity for specifically controlling the lens pitch in the center area of the Fresnel lens of the sheet, relative to the black stripe pitch in the lenticular lens sheet so as to prevent moire fringes from appearing in the center area of the screen. Therefore, in the Fresnel lens sheet of the invention which is so controlled that the lens pitch of the concentrically-configured Fresnel lens of the sheet in the center area of the lens could differ from that in the peripheral area thereof, the lens pitch in the peripheral area of the sheet may be specifically defined so as not to give moire fringes appearing in screens. However, the screen in which the lens pitch of the lenticular lens is the same as that of the Fresnel lens will have moire fringes even in its center area. Therefore, when the Fresnel lens sheet of the invention is combined with a lenticular lens sheet, it is desirable that the lens pitch of the Fresnel lens of the former sheet is smaller than that of the lenticular lens of the latter sheet.

The Fresnel lens sheet of the invention may be combined with a lenticular lens sheet to construct a screen, and the screen may be combined with projection lens and with CRTs, liquid crystal panels or the like to construct a rear PTV system.

Figure 9:
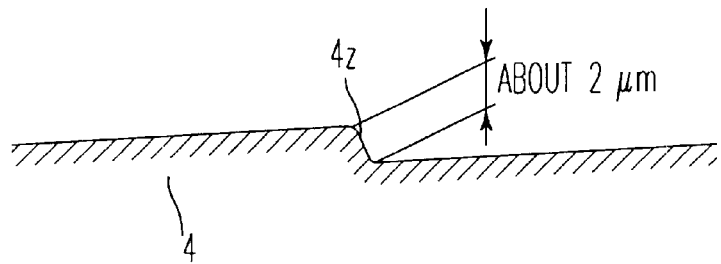
FIG. 9 is a view schematically showing the profile of the rising surface in the center area of the Fresnel lens sheets of Examples 1 to 5 and Comparative Example.

The Fresnel lens sheet of the invention is described more concretely with reference to the following Examples, which demonstrate the application of the Fresnel lens sheet of the invention for screens for rear PTV systems having a projection distance of 850 mm. In those Examples, the Fresnel lens sheet of the invention is combined with a lenticular lens sheet having a peak gain of 9.7. The focal length of the Fresnel lens of the Fresnel lens sheet gradually increases from 740 mm up to 840 mm in the direction running from the center of the concentrically-configured lens toward the outermost periphery of the lens. In the Fresnel lens sheets of the following Examples, the relationship between the distance from the center of the Fresnel lens (that is, the Fresnel lens radius) and the Fresnel lens pitch is shown in FIG. 7A to FIG. 7E. The details of the Fresnel lens sheets of the Examples are mentioned below. The profile of the rising surface in the center area of the Fresnel lens sheets of the Examples and Comparative Example is illustrated in FIG. 9. As illustrated, the length of the rising surface is about 2 $\mu$m.

EXAMPLE 1

In Example 1, prepared was a Fresnel lens sheet in which the center area of the Fresnel lens spaced away from the center of the lens by less than 15 mm had a constant lens pitch, but in which the lens pitch in the peripheral area of the lens was linearly reduced to a predetermined value. Concretely, in the Fresnel lens sheet prepared herein, the lens pitch profile of the Fresnel lens was so designed that the area of the lens falling between 30 mm spaced away from the center of the lens and the outermost periphery of the lens could have a constant lens pitch of 0.07 mm, the area falling between the center of the lens and 15 mm spaced away from the center could have a constant lens pitch of 0.16 mm, and the area falling between 15 mm and 30 mm spaced away from the center of the lens could have a lens pitch linearly varying from 0.16 mm to 0.07 mm, as in FIG. 7A.

EXAMPLE 2

In Example 2, prepared was a Fresnel lens sheet in which the peripheral area of the Fresnel lens had a predetermined constant lens pitch, but in which the lens pitch in the center area of the lens was reduced to reach the predetermined constant value in a linear mode in accordance with the distance from the center of the lens. Concretely, in the Fresnel lens sheet prepared herein, the lens pitch profile of the Fresnel lens was so designed that the lens pitch in the center of the lens could be 0.24 mm, the area of the lens falling between 30 mm spaced away from the center of the lens and the outermost periphery thereof could have a constant lens pitch of 0.07 mm, and the area falling between the center of the lens and 30 mm spaced away from the center could have a lens pitch linearly varying from 0.24 mm to 0.07 mm, as in FIG. 7B.

EXAMPLE 3

In Example 3, prepared was a Fresnel lens sheet in which the center area of the Fresnel lens spaced away from the center of the lens by less than 15 mm had a constant lens pitch, but in which the lens pitch in the peripheral area of the lens was gently reduced to a predetermined value. Concretely, in the Fresnel lens sheet prepared herein, the lens pitch profile of the Fresnel lens was so designed that the area of the lens falling between 30 mm spaced away from the center of the lens and the outermost periphery of the lens could have a constant lens pitch of 0.07 mm, the area falling between the center of the lens and 15 mm spaced away from the center could have a constant lens pitch of 0.16 mm, and the area falling between 15 mm and 30 mm spaced away from the center of the lens could have a lens pitch gently varying from 0.16 mm to 0.07 mm, as in FIG. 7C.

EXAMPLE 4

In Example 4, prepared was a Fresnel lens sheet in which the peripheral area of the Fresnel lens had a predetermined constant lens pitch, but in which the lens pitch in the center area of the lens was reduced to reach the predetermined constant value not in a linear mode but gently in accordance with the distance from the center of the lens. Concretely, in the Fresnel lens sheet prepared herein, the lens pitch profile of the Fresnel lens was so designed that the lens pitch in the center of the lens could be 0.40 mm, the area of the lens falling between 30 mm spaced away from the center of the lens and the outermost periphery thereof could have a constant lens pitch of 0.07 mm, and the area falling between the center of the lens and 30 mm spaced away from the center could have a lens pitch gently varying from 0.40 mm to 0.07 mm, as in FIG. 7D.

EXAMPLE 5

In Example 5, prepared was a Fresnel lens sheet in which the peripheral area of the Fresnel lens had a predetermined constant lens pitch, but in which the lens pitch in the center area of the lens was stepwise reduced to reach the predetermined constant value in accordance with the distance from the center of the lens. Concretely, in the Fresnel lens sheet prepared herein, the lens pitch profile of the Fresnel lens was so designed that the lens pitch in the center of the lens could be 0.16 mm, the area of the lens falling between 30 mm spaced away from the center of the lens and the outermost periphery thereof could have a constant lens pitch of 0.07 mm, and the area falling between the center of the lens and 30 mm spaced away from the center could have a lens pitch stepwise varying from 0.16 mm to 0.07 mm, as in FIG. 7E.

The screens of the above Examples were tested for the presence of absence of white spots appearing thereon and for the presence of absence of moire fringes appearing in the center area of each screen. Precisely, the Fresnel lens sheet of the invention prepared above was combined with the lenticular lens sheet mentioned above, and fitted into a rear PTV system. A complete white signal was inputted into the system at an ordinary voltage, and the screen was viewed at a distance of 1.5 m spaced away from the front of the screen. The height of the viewing site was about 1.5 m. The test data are in Table 2.

TABLE 2

Figure 7A:
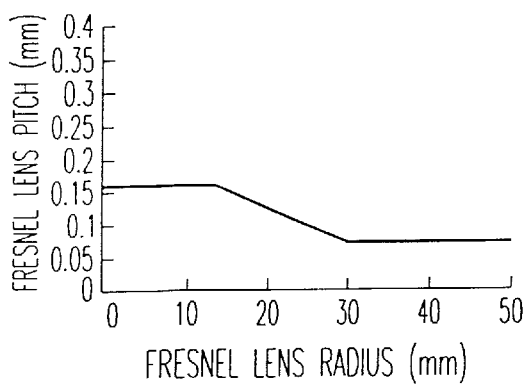
FIG. 7A to FIG. 7E are graphs each indicating the relationship between the distance from the Fresnel lens center (Fresnel lens radius) and the Fresnel lens pitch in the Fresnel lens sheets of Examples 1 to 5 of the invention.
Figure 7B:
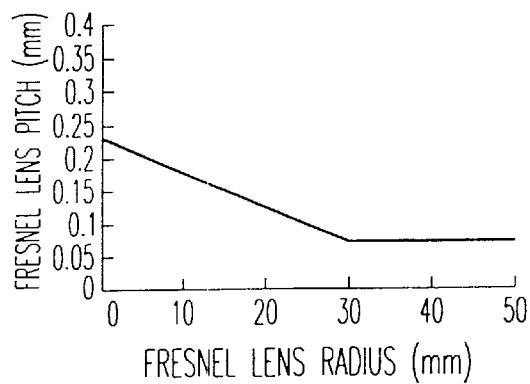

|  | White Spots | Moire Fringes | Fresnel Lens Pitch Pattern |
|---|---|---|---|
| Example 1 | ○ | ○ | FIG. 7A |
| Example 2 | ○ | ○ | FIG. 7B |

TABLE 2-continued

Figure 7C:
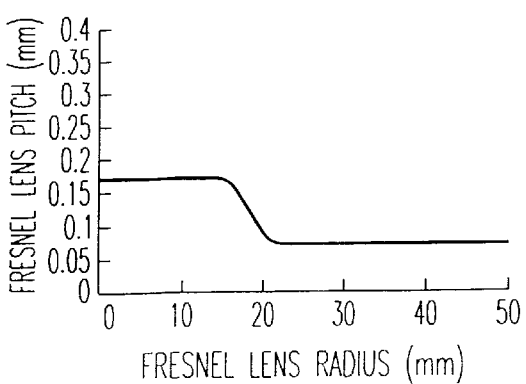
Figure 7D:
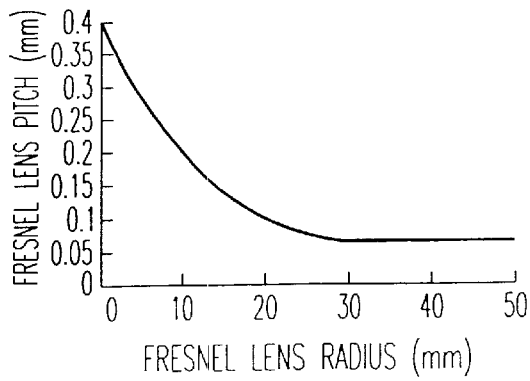
Figure 7E:
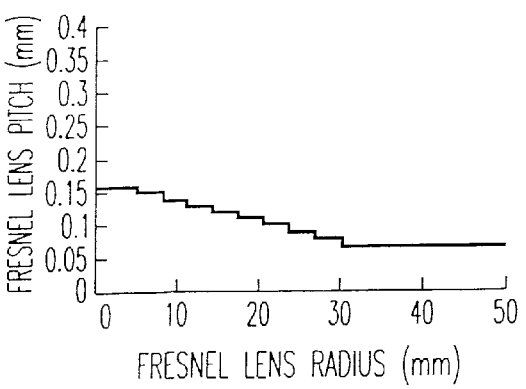
Figure 8:
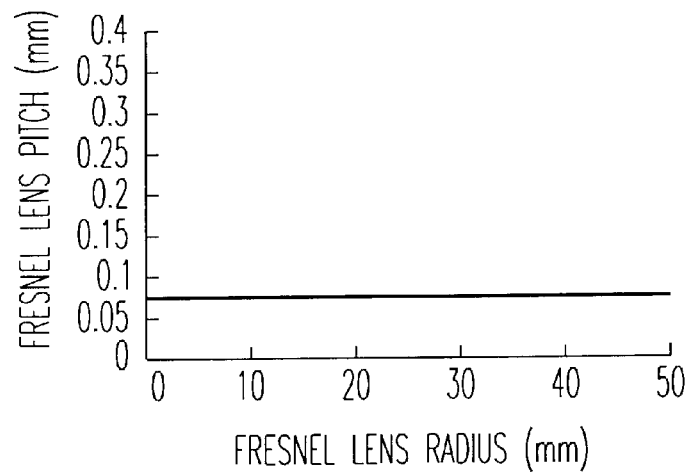
FIG. 8 is a graph indicating the relationship between the distance from the Fresnel lens center (Fresnel lens radius) and the Fresnel lens pitch in the Fresnel lens sheet of Comparative Example.

|  | White Spots | Moire Fringes | Fresnel Lens Pitch Pattern |
|---|---|---|---|
| Example 3 | ○ | ○ | FIG. 7C |
| Example 4 | ○ | ○ | FIG. 7D |
| Example 5 | ○ | ○ | FIG. 7E |
| Comparative Example | × | ○ | FIG. 8 |

○: No white spot (moire fringe) appeared.
×: Clear white spots appeared.

Comparative Example

In Comparative Example, prepared was a Fresnel lens sheet of which the lens had a constant lens pitch everywhere on its entire surface. Concretely, of the Fresnel lens sheet prepared herein, the lens had a constant lens pitch of 0.07 mm throughout from its center to its outermost periphery.

As in Table 2, white spots appeared on the screen of Comparative Example, but not on the screens of Examples 1 to 5. Like that of Comparative Example, the screens of Examples 1 to 5 gave no moire fringes.

As described in detail hereinabove, the Fresnel lens sheet of the invention has the advantage of reducing unnecessary rays of light that may go out around the center area of the concentrically-configured Fresnel lens of the sheet. Therefore, when the Fresnel lens sheet is combined with a lenticular lens sheet to construct a viewing screen, the screen has the advantage of preventing white spots from appearing around its center area.

While the invention has been described in detail and with reference to specific embodiments thereof, it will be apparent to one skilled in the art that various changes and modifications can be made therein without departing from the spirit and scope thereof.

What is claimed is:

1. A Fresnel lens sheet for screens for rear projection image displays, wherein the lens pitch in a center area of the concentrically-configured Fresnel lens of the sheet differs from that in the peripheral area thereof, and wherein the lens pitch in the center area is larger than that in a peripheral area of the sheet, wherein the lens pitch in the peripheral area is constant.

2. The Fresnel lens sheet as claimed in claim 1, wherein the center area of the lens is spaced from the concentric center of the lens by less than 20 mm, and the lens pitch in said center area is at least 0.1 mm.

3. The Fresnel lens sheet as claimed in claim 1 or 2, wherein the lens pitch is continuously reduced in accordance with the distance from the concentric center of the lens.

4. The Fresnel lens sheet as claimed in claim 1 or 2, wherein the lens pitch is stepwise reduced in accordance with the distance from the concentric center of the lens.

5. The Fresnel lens sheet as claimed in any one of claims 1 or 2, which is combined with a lenticular lens sheet and of which the lens pitch in the center area is smaller than the lens pitch of the combined lenticular lens sheet.

6. The Fresnel lens sheet as claimed in claim 1, wherein said peripheral area is not less than 20 mm from a center of the lens sheet.

7. The Fresnel lens sheet as claimed in claim 1, wherein the lens pitch in a center area of the concentrically-configured Fresnel lens of the sheet decreases with increased radius of the lens on the sheet.

* * * * *